(12) United States Patent
Branch

(10) Patent No.: US 8,554,135 B2
(45) Date of Patent: Oct. 8, 2013

(54) CONTROLLING POWER DISSIPATION IN A BASE STATION OF A NAVIGATION SATELLITE SYSTEM (NSS)

(75) Inventor: Charles Branch, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 340 days.

(21) Appl. No.: 13/048,132

(22) Filed: Mar. 15, 2011

(65) Prior Publication Data

US 2012/0236907 A1 Sep. 20, 2012

(51) Int. Cl.
*H04B 7/185* (2006.01)
(52) U.S. Cl.
USPC .............. 455/13.4; 342/357.12; 342/357.23; 342/357.24; 342/357.42; 342/357.57
(58) Field of Classification Search
USPC ........................................................ 455/13.4
See application file for complete search history.

(56) References Cited

U.S. PATENT DOCUMENTS

| | | | | |
|---|---|---|---|---|
| 3,648,173 A * | 3/1972 | Elliott | | 375/373 |
| 3,728,485 A * | 4/1973 | Osborne et al. | | 375/362 |
| 6,744,403 B2 * | 6/2004 | Milnes et al. | | 342/357.57 |
| 6,985,104 B2 * | 1/2006 | Large et al. | | 342/357.27 |
| 7,456,786 B2 * | 11/2008 | Large et al. | | 342/357.27 |
| 7,743,177 B2 | 6/2010 | Jia et al. | | |
| 7,855,678 B2 * | 12/2010 | Scherzinger et al. | | 342/357.23 |
| 7,866,386 B2 * | 1/2011 | Beer et al. | | 166/258 |
| 7,866,388 B2 * | 1/2011 | Bravo | | 166/267 |
| 8,011,451 B2 * | 9/2011 | MacDonald | | 175/61 |
| 8,113,272 B2 * | 2/2012 | Vinegar | | 166/60 |
| 8,151,907 B2 * | 4/2012 | MacDonald | | 175/95 |
| 8,162,405 B2 * | 4/2012 | Burns et al. | | 299/2 |
| 8,172,335 B2 * | 5/2012 | Burns et al. | | 299/2 |
| 8,177,305 B2 * | 5/2012 | Burns et al. | | 299/2 |
| 8,232,917 B2 * | 7/2012 | Scherzinger et al. | | 342/357.24 |
| 8,271,194 B2 | 9/2012 | Whitehead et al. | | |
| 8,276,661 B2 * | 10/2012 | Costello et al. | | 166/260 |
| 8,441,398 B2 | 5/2013 | Rao et al. | | |
| 2002/0057217 A1 * | 5/2002 | Milnes et al. | | 342/357.07 |
| 2003/0048218 A1 * | 3/2003 | Milnes et al. | | 342/357.07 |
| 2004/0203697 A1 * | 10/2004 | Finn | | 455/420 |
| 2006/0208943 A1 * | 9/2006 | Gronemeyer | | 342/357.12 |
| 2008/0122785 A1 * | 5/2008 | Harmon | | 345/156 |
| 2009/0002227 A1 * | 1/2009 | Jia et al. | | 342/357.06 |
| 2009/0322600 A1 * | 12/2009 | Whitehead et al. | | 342/357.06 |
| 2010/0171659 A1 * | 7/2010 | Waters et al. | | 342/357.12 |
| 2011/0103432 A1 * | 5/2011 | Tangudu et al. | | 375/150 |
| 2011/0187596 A1 * | 8/2011 | Rao et al. | | 342/357.66 |
| 2012/0136573 A1 * | 5/2012 | Janardhanan et al. | | 701/512 |
| 2013/0090881 A1 * | 4/2013 | Janardhanan et al. | | 702/104 |

* cited by examiner

*Primary Examiner* — Hai V Nguyen

(57) ABSTRACT

A method and system for controlling power dissipation in a base station of a navigation satellite system (NSS) is disclosed. One method utilizes a sensor to monitor one or more components of the base station. Then, based on information from the sensor, a transmission bit rate is increased from a pre-defined bit rate to an increased transmission bit rate for an NSS message transmitted from the base station without reducing transmission power level of the base station. The method also periodically provides a bit rate update signal at the pre-defined bit rate, the bit rate update signal informing a rover utilizing the base station of the increased transmission bit rate for the NSS message transmitted from the base station.

31 Claims, 9 Drawing Sheets

600

UTILIZE A SENSOR TO MONITOR ONE OR MORE COMPONENTS OF THE BASE STATION
605

INCREASES A TRANSMISSION BIT RATE, BASED ON INFORMATION FROM THE SENSOR, FROM A PRE-DEFINED BIT RATE TO AN INCREASED TRANSMISSION BIT RATE FOR AN NSS MESSAGE TRANSMITTED FROM THE BASE STATION WITHOUT REDUCING A TRANSMISSION WATTAGE OF THE BASE STATION
610

PERIODICALLY PROVIDES A BIT RATE UPDATE SIGNAL AT THE PRE-DEFINED BIT RATE, THE BIT RATE UPDATE SIGNAL INFORMING A ROVER UTILIZING THE BASE STATION OF THE INCREASED TRANSMISSION BIT RATE FOR THE NSS MESSAGE TRANSMITTED FROM THE BASE STATION
615

FIG. 6

CONTROLLING POWER DISSIPATION IN A BASE STATION OF A NAVIGATION SATELLITE SYSTEM (NSS)

FIELD

The invention relates to controlling power dissipation in a base station of a navigation satellite system (NSS).

BACKGROUND

In general, the radiated RF power of a base station controls the maximum distance at which broadcast data can be received and utilized by a rover. For example, suppose a 35-Watt transmission broadcast from a base station has a maximum useful range of 20 miles. That would mean that any rover within a 20 mile radius from the base station would be able to receive and utilize the transmitted data. In contrast, if the base station were only transmitting at 5 Watts, the broadcast may only have a maximum useful range of 7.5 miles.

Thus, in many operational environments having a base station transmitting at a higher power level is better operationally and logistically. Moreover, having a base station transmitting at a higher power level would allow a user to save money by covering a larger area with fewer base stations.

However, one of the costs of transmitting at a high power level is heat: specifically, heat build-up occurring within the firmware/hardware of the base station. The heat build-up can deleteriously affect the base station operations and if left unchecked can render the base station inoperable. An alternate method for controlling the heat build-up in a base station is to reduce the transmitter's power level. However, as previously stated, reducing the transmission power level will significantly affect the range.

SUMMARY OF THE INVENTION

Embodiments provided herein recite methods and systems for controlling power dissipation in a base station of a navigation satellite system (NSS) is disclosed. One method utilizes a sensor to monitor one or more components of the base station. Then, based on information from the sensor, a transmission bit rate is increased from a first, continuous pre-defined bit rate to an increased transmission bit rate operating in a burst mode, for a given NSS message size, transmitted from the base station without changing transmission power level of the base station transmitter. The method also periodically provides a bit rate update signal at the pre-defined bit rate, the bit rate update signal informing a rover utilizing the base station of the increased transmission bit rate for the NSS message transmitted from the base station.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6 is a flowchart of a method for controlling power dissipation of a base station of a navigation satellite system in accordance with one embodiment of the present technology.

DESCRIPTION OF EMBODIMENTS

Figure 1:
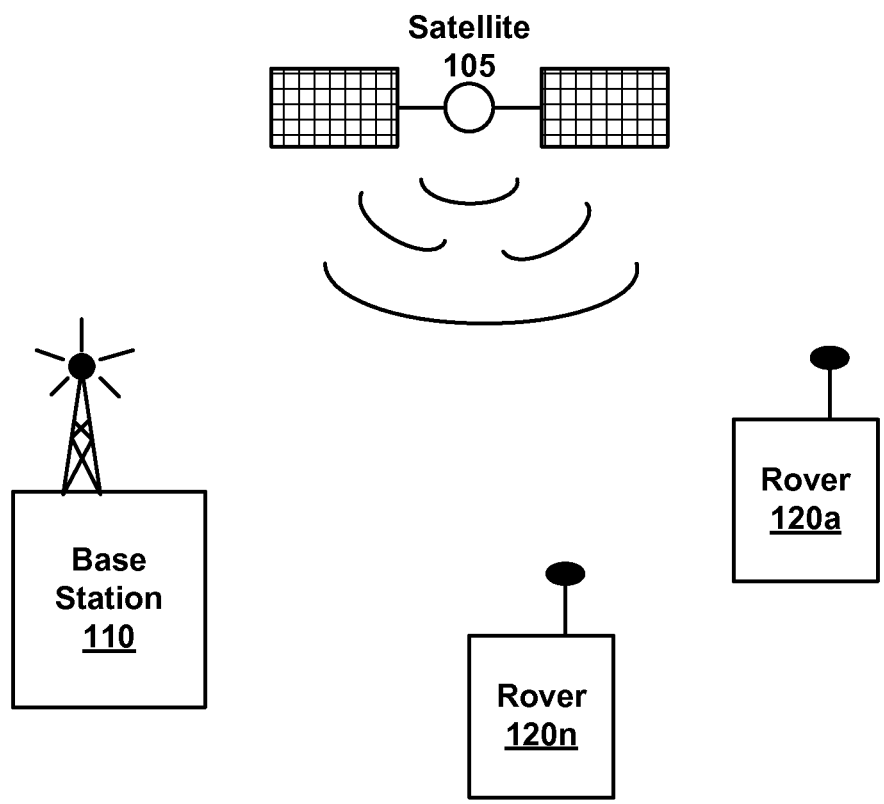
FIG. 1 is a block diagram of a navigation satellite system including base station power dissipation control is shown in accordance with one embodiment of the present technology.

Embodiments disclosed herein provide methods and systems for controlling internal power dissipation in a base station of a navigation satellite system (NSS) is disclosed. One method includes increasing a transmission bit rate from a pre-defined bit rate to an increased transmission bit rate for an NSS message transmitted from the base station without reducing transmission power level of the base station. The method also periodically provides a bit rate update signal at the pre-defined bit rate, the bit rate update signal informing a rover utilizing the base station of the increased transmission bit rate for the NSS message transmitted from the base station.

Overview

In one embodiment, a method for reducing the on/off duty cycle of a radio transmitter to less than 100% is utilized to reduce the heat load created. Moreover, one embodiment described herein adjusts the data rate to maintain the data delivery integrity of the desired aggregate throughput. Thus, the duty cycle of the transmitter, e.g., the percentage of time the radio is transmitting, may be reduced by some percentage while the actual data rate of the transmitter can be increased, to meet the needs of the rover radio system. A more detailed discussion for increasing the data rate transmission can be found in U.S. Pat. No. 6,985,104. U.S. Pat. No. 6,985,104, by Peter Large et al, entitled "Method and System for Variable Data Rate Transmission in RTK GPS Survey System," is incorporated by reference, in its entirety, herein.

In other words, the data rate is increased, the duty cycle is reduced and the output power while transmitting remains unchanged. In so doing, embodiments described herein reduce the percentage of time the radio is generating appreciable heat while maintaining the user-set output power. For example, a radio may consume 130 Watts when transmitting 35 Watts; of these 130 input Watts, 35 Watts may be converted into radio waves while 95 Watts are turned into heat. By reducing the duty cycle, the generation of heat is reduced.

In a survey system, the corrections data must be delivered within a given time frame, which dictates the transmission data rate. To get a decent range of operation, the maximum power allowed by regulation has been implemented in most survey base station systems. However, if the data rate is increased by a factor of two, the transmitter operating time period can be reduced by a factor of two, thereby reducing the time period when the power amplifier is delivering power and also dissipating power internally. The tradeoff between data rate and transmit power level in this case means that the range of operation will be reduced. This is because the total transmit RF power is still the same maximum number, in this case 35 Watts, but the data rate has been doubled. This reduces the transmitted power per bit of data, thus reducing the signal to noise ratio for all distant receivers. In this case the aggregate sum of data over a second's time will be the same as if the data were being delivered at a lower but continuous rate.

For example, if the normal, continuous data rate is 9600 bits/second (baud), and for the particular environmental conditions, the transmitter is getting too hot, by increasing the data rate and utilizing bursting transmission with the same original transmit power, the total data needed in a the needed time frame can be delivered in half the time, thereby allowing the operating duty cycle to be decreased. The decrease in duty cycle will allow the power amplifier to have a portion of time that it is not transmitting and therefore not generating additional internal heat. If the burst rate were doubled, to 19,200 bits/second, then the duty cycle could be cut in half requiring the power amplifier to only be "on" for half as much time. In so doing, the heat generated by the operation of the power amplifier would be less. In one embodiment, the reduction in heat generation could slow the overall temperature rise in the system. In another embodiment, the reduction in heat generation could allow the heat sinks to keep up with the heat dissipation and stop the rise of the temperature in the system. In yet another embodiment, the reduction in heat generation could allow the system to get ahead of the temperature rise and actually begin to lower the temperature of one or more components of the system.

In one embodiment, the penalty for operation in the burst mode is that the operational distance between the transmitter and any rover in the region will be reduced by a factor 0.707. So in an operational scenario where a 20 mile range is being achieved, this range will drop to about 14 miles.

However, this reduction in range can be compensated for by adding forward error correction (FEC) to the data stream, which provides a significant reduction in signal-to-noise ratio requirement for the same bit error rate performance. FEC encoder/decoders provide 2-6 dB of coding gain, which can be used to compensate for the 3 dB loss of range.

For clarity in the following discussion, bit rate refers to how many data bits are transmitted per second. In contrast, baud rate refers to the measurement of the number of times per second a signal in a communications channel changes.

For example, in one embodiment, bit rates measure of the number of data bits transmitted in one second in a communication channel. A figure of 4800 bits per second means 4800 zeros or ones can be transmitted in one second.

In contrast, baud rate refers to the number of times a signal in a communications channel changes state or varies. For example, a 2400 baud rate means that the channel can change states up to 2400 times per second. In general, bit bate (bps) and baud rate (baud per second) may be contrasted as:

bps=baud per second×the number of bit per baud.

With reference now to FIG. 1, a block diagram of a navigation satellite system (NSS) 100 is shown in accordance with one embodiment of the present technology. In general, NSS 100 may be a global navigation satellite system (GNSS), Glonass, Galileo, Compass, various SBAS systems and the like.

In one embodiment, NSS 100 includes a satellite 105, a base station 110 and rovers 120a-120n. Although only a few components of NSS 100 are shown, the present technology is well suited to numerous configurations. For example, although only a single satellite 105 is shown for clarity, more than one satellite 105 may be utilized. Similarly, although only a single base station 110 is shown for clarity, more than one base station 110 may be utilized. Furthermore, although two rover 120a and 120n are shown for clarity, any number of rovers may be operational within the NSS 100.

In the following discussion, NSS 100 may utilize differential global positioning system (DGPS) type methodology, Real Time Kinematic system methodology, or the like. For purposes of clarity, an overview of DGPS and RTK are provided herein in conjunction with FIG. 1.

DGPS

In one embodiment, DGPS utilizes base station 110 which is located at a surveyed position to gather data and deduce corrections for the various error contributions which reduce the precision of determining a position fix. For example, as satellite 105 signals pass through the ionosphere and troposphere, propagation delays may occur. Other factors which may reduce the precision of determining a position fix may include satellite 105 clock errors, rover 120 clock errors, and satellite 105 position errors (ephemerides). In one embodiment, base station 110 receives essentially the same satellite 105 signals as rover 120a-n which may also be operating in the area. However, instead of using the timing signals from the satellite 105 to calculate its position, base station 110 uses its known position to calculate timing. In other words, base station 110 determines what the timing signals from the satellite 105 should be in order to calculate the position at which base station 110 is known to be. The difference between the received satellite 105 signals and what they optimally should be is used as an error correction factor for the rover 120a-n in the area. Typically, base station 110 broadcasts the error correction (e.g., rover broadcast data 250 of FIG. 2) to, for example, rover 120 which uses this data to determine its position more precisely. Alternatively, the error corrections may be stored for later retrieval and correction via post-processing techniques.

RTK

An alternate embodiment, the RTK method, utilizes base station 110 located at a determined or surveyed point. Base station 110 collects data from the same satellite 105 (or collection of satellites) in view of rover 120 in the area. Measurements of satellite 105 signal errors taken at base station 110 (e.g., dual-frequency code and carrier phase signal errors) are broadcast (e.g., rover broadcast data 250 of FIG. 2) to one or more rover 120 working in the area. The rover(s) 120 combine base station 110 data with locally collected position measurements to estimate local carrier-phase ambiguities, thus allowing a more precise determination of the position of rover 120.

The RTK method is different from DGPS methods in that the vector from base station 110 to rover 120 is determined (e.g., using the double differences method). In DGPS methods, base station 110 is used to calculate the changes needed in each pseudorange for a given satellite 105 in view of base station 110 and rover 120, to correct for the various error contributions. Thus, DGPS systems broadcast pseudorange correction numbers second-by-second for each satellite 105 in view, or store the data for later retrieval as described above.

Figure 2:
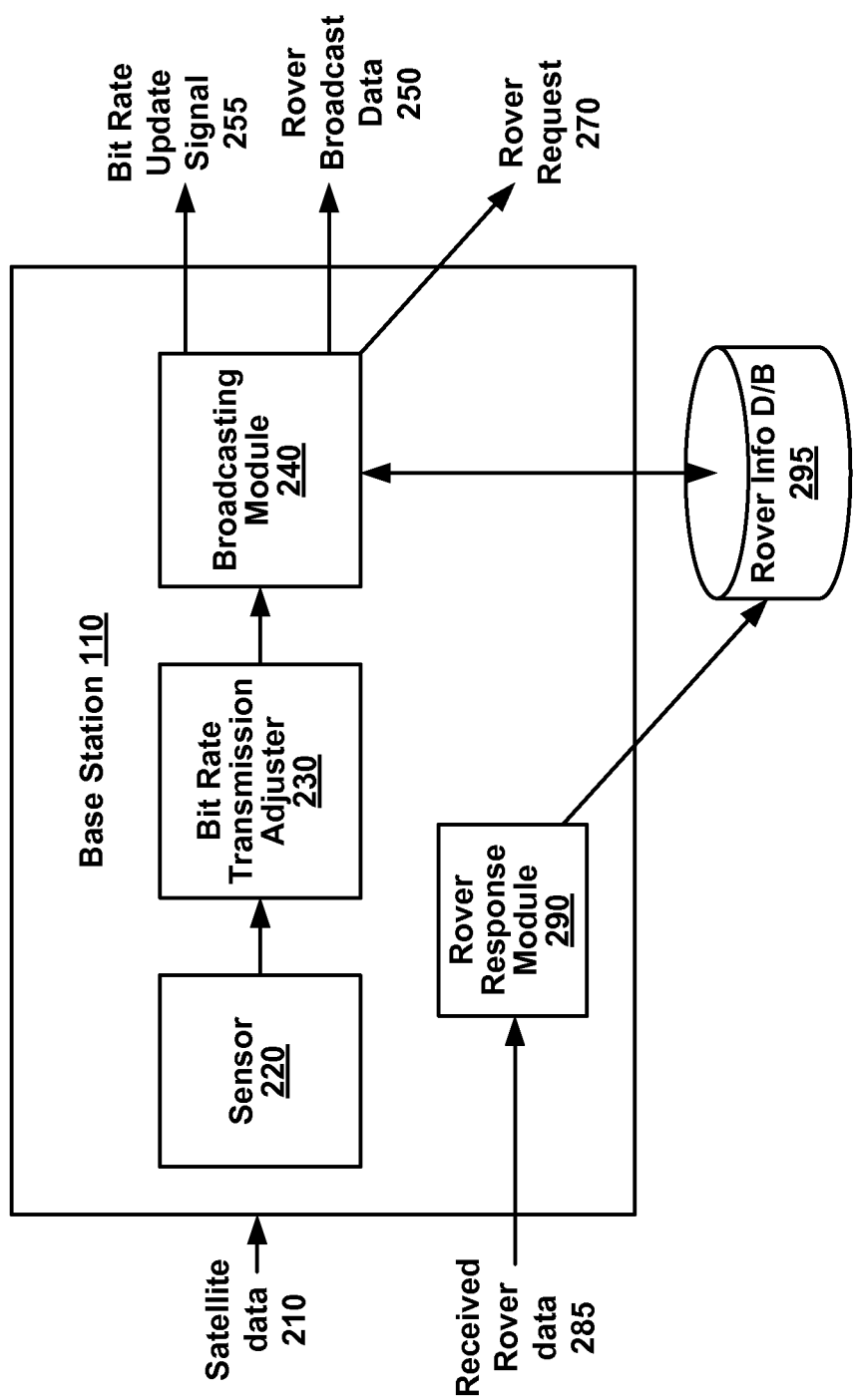
FIG. 2 is a block diagram of a system for controlling power dissipation in a base station of a navigation satellite system in accordance with one embodiment of the present technology.

With reference now to FIG. 2, a block diagram of a system for controlling power dissipation in a base station 110 utilized in NSS 100 is shown in accordance with one embodiment of the present technology. In one embodiment, base station 110 receives satellite data 210 performs the operations as described above with respect to RTK, DGPS, or the like and outputs rover broadcast data 250 for utilization by rover 120.

However, in FIG. 2, an additional number of components are utilized by base station 110 to increase the amount of time base station 110 is capable of controlling power dissipation. In one embodiment, base station 110 includes sensor 220, bit rate transmission adjuster 230 and broadcasting module 240.

In one embodiment, broadcasting module 240 is utilized to broadcast rover broadcast data 250 as described in FIG. 1. However, in one embodiment, broadcasting module 240 is also utilized herein to broadcast bit rate update signal 255 and rover request 270. In general, rover broadcast data 250 is transmitted from base station 110 at a pre-defined bit rate. However, if bit rate transmission adjuster 230 has adjusted the bit rate of the broadcast, bit rate update signal 255 is utilized to provide the new bit rate information to the rover 120. For example, in conjunction with broadcasting rover broadcast data 250 at the new bit rate, every few seconds broadcasting module 240 will broadcast the update information using the pre-defined bit rate. One example of bit rate update signal 255 may be a message that informs any receiver that the actual information from base station 110 is now being broadcast at a new bit rate. In other words, bit rate update signal 255 may provide a detailed message or may simply provide the bit rate being utilized.

For example, if base station 110 had a pre-defined broadcast bit rate of 4800 bits per second (bps) but had been updated to broadcasting at 9600 bps, bit rate update signal 255 would be transmitted at 4800 bps and inform all users to adjust to 9600 bps to receive rover broadcast data 250. In one embodiment, the message may tell all the radios to increase the radio link rate to the next level up. Similarly, if base station 110 has a reduction in temperature, the message may tell all the radios to decrease the radio link to the next level down.

Although the bit rate update signal 255 is described herein as providing a signal for a bit rate adjustment between 4800 bps and 9600 bps, other ranges are also well suited for utilization. For example, the bit rate adjustment range may be defined by the equation:

Adjusted range=(base rate)*(adjust increment)

Where:

base rate is the default bit rate (e.g., 2400 bps, 4800 bps, 9600 bps, etc.); and adjust increment is any increment from zero that is feasible for the system. In one embodiment the adjust increment may be allocated in a discrete step such as, e.g., 0.5, 1.5, 2, etc. However, in another embodiment, the adjust increment may be allocated in a continuous manner such as, e.g., 0.1, . . . 0.2, . . . 0.5, . . . 0.75, . . . 1.0, . . . 1.05, 1.1, . . . 1.5, . . . 2, . . . 3, . . . etc.

Thus, the bit rate adjustment may be continuously variable or discretely variable, over any feasible range. In other words, the range for the bit rate adjustment may operate similarly to a tuning knob that could be turned continuously or discretely to adjust the data rate. It is also noted, as discussed herein, that the adjustment range may not only be increased but also decreased.

In one embodiment, sensor 220 is utilized to monitor one or more of the components within base station 110. Further detail of sensor 220 is provided in FIG. 3.

Figure 3:
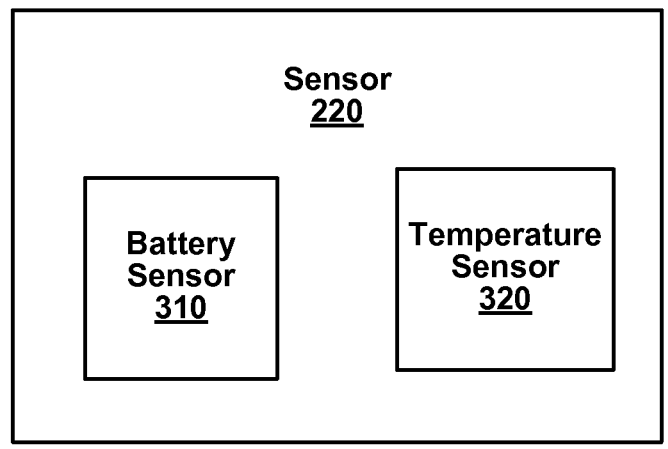
FIG. 3 is a block diagram of a component sensor in accordance with one embodiment of the present technology.

In one embodiment, as shown in FIG. 3, sensor 220 may include a battery sensor 310. In another embodiment, sensor 220 may include a temperature sensor 320. In yet another embodiment, sensor 220 may include battery sensor 310 and temperature sensor 320. As described in more detail herein, sensor 220 is utilized to monitor one or more components within base station 110 to ensure that the base station 110 transmissions can remain at the selected power level. For example, if base station 110 were set to transmit at 30 Watts, sensor 220 would monitor conditions of components including temperature, battery life, and the like. When a component was approaching or reached a threshold, such as a temperature threshold, or the like, sensor 220 would provide that information to bit rate transmission adjuster 230. For example, if sensor 220 reaches a temperature threshold, bit rate transmission adjuster 230 would adjust the bit rate to reduce the generation of heat at base station 110 as described in detail in FIGS. 4, 5A and 5B.

Figure 4:
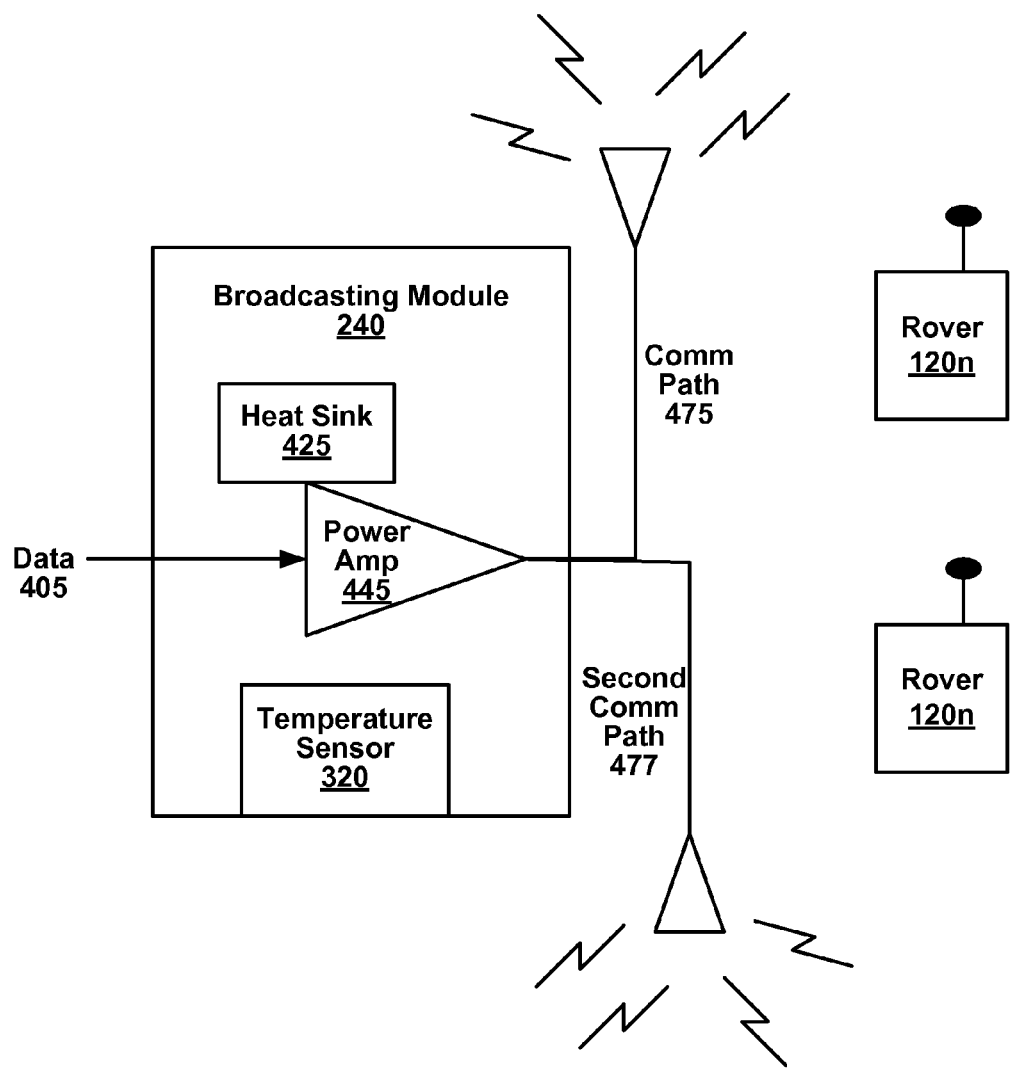
FIG. 4 is a block diagram of a number of components of the broadcasting module including a power amplifier, head sink and temperature sensor in accordance with one embodiment of the present technology.

With reference now to FIG. 4, a block diagram of a broadcasting module 240 including a power amplifier 445, head sink 425 and temperature sensor 320 is shown in accordance with one embodiment. Broadcasting module 240 of FIG. 4 also includes a communications path 475 and an optional secondary communications path 477. In one embodiment, power amplifier 445 processes DC power into transmit power when a signal 405 is presented to its input. The DC power is partially converted in output, transmitted power, at some conversion rate, typically called "efficiency". The untransmitted power is said to be "dissipated" as heat buildup in the transistors, spreading to heat sink 425, and thence to the outside world.

As described in further detail herein, one embodiment operates in conjunction with the components of FIGS. 2 and 4 to provide an on/off duty cycle of a radio transmitter of less than 100% to reduce the heat load created. In one embodiment, the heat load is reduced by adjusting the data rate to maintain data delivery integrity of the desired aggregate throughput as shown and described at FIGS. 5A and 5B.

Figure 5A:
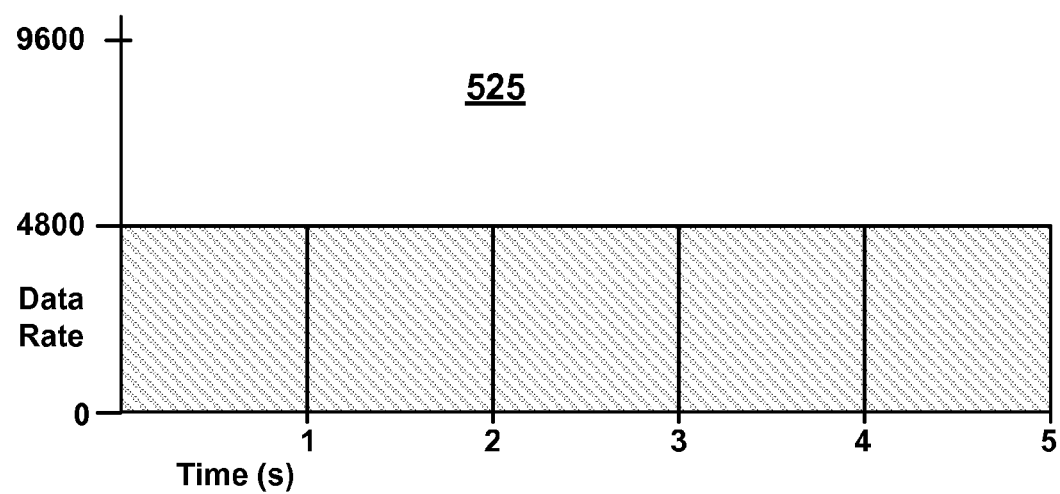
FIG. 5A is a graphical example of a 100% duty cycle of a power amp for a given data rate over a time period in accordance with one embodiment of the present technology.
Figure 5B:
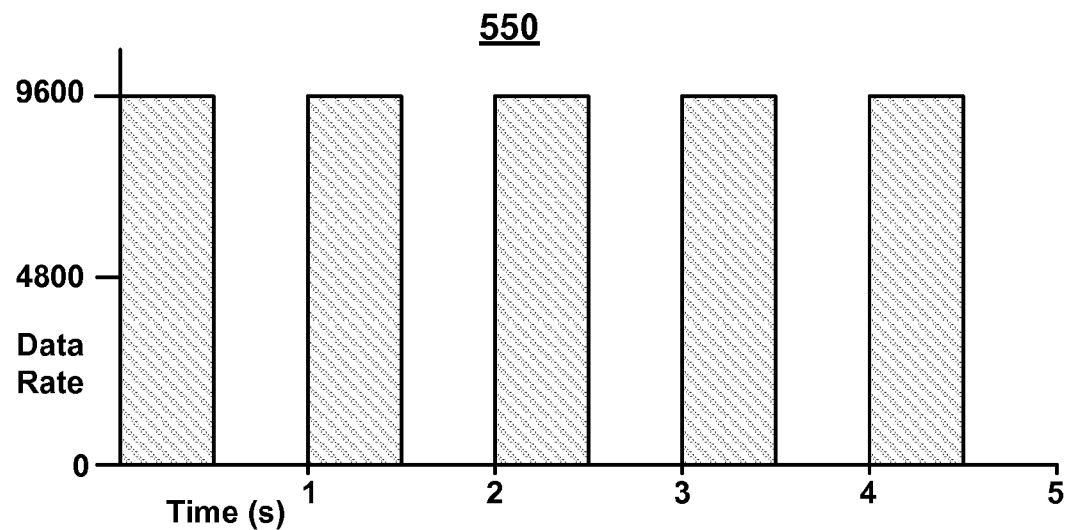
FIG. 5B is a graphical example of a less than 100% duty cycle of a power amp for a maintaining a given data rate over a time period in accordance with one embodiment of the present technology.

With reference now to FIGS. 5A and 5B graphical examples of the duty cycle of a power amp are shown for a data rate over a time period shown in seconds. In other words, graphs 525 and 550 illustrate one embodiment for trading a higher data rate for reduced range and non-100% duty cycle. In one embodiment, the reduced range is compensated for by adding forward error correction (FEC) to the data stream, which provides a significant reduction in signal-to-noise ratio requirement for the same bit error rate performance. FEC encoder/decoders provide 2-6 dB of coding gain, which can be used to compensate for the 3 dB loss of range.

In FIG. 5A, the graph illustrates one embodiment of a bit rate of 4800 for a power amplifier that is transmitting from the base station 110 as is evident from graph 525, the duty cycle for the power amplifier 445 transmitting from the base station 110 is approximately 100%, as such there is almost no down time for power amplifier 445 as it is constantly transmitting at the specified power output (e.g., 35 Watts). However, Graph 550 of FIG. 5B illustrates an increase in the bit rate from 4800 to 9600 bps. By doubling the bit rate, the duty cycle of power amplifier 445 is reduced to approximately 50% while the specified power output (e.g., 35 Watts) remains constant.

By reducing the duty cycle, the broadcasting module 240 (which includes power amplifier 445) would be able to achieve previously unavailable cooling for a number of reasons, such as but not limited to, during the non-operational portion of time, no further heat is being generated; the heat dissipation capabilities of one or more heat sinks 425 may continue during the off portion of the cycle, and the like. Thus, reduction of the heat generated by power amplifier 445 will allow the components of broadcasting module 240 to remain within tolerances without deleteriously affecting the specified power output at base station 110. In other words, the RF power amplifier may be designed such that internal power dissipation is very low when no transmit signal is present. This mode of operation will enables the reduction in internal power dissipation available when operating in a burst mode.

For example, as shown in graph 550, when the over-the-air radio link rate is increased, e.g., from 4800 to 9600 bps, power amplifier 445 would draw half as much power while maintaining the same specified power output. Moreover, since the heat generation of power amplifier 445 is proportional to the duty cycle, if the data packet is 4800 bits long (including overhead), the radio link rate is 9600 and the update rate is the standard 1 Hz, the radio takes 500 ms to transmit the packet. Thus, over a 1 second period, if the radio link rate is increased from 4800 to 9600 bps, power amplifier 445 is on only half the time. Therefore the amount of heat generated is also half as much as when power amplifier 445 is on for the entire second. Although a 50% duty cycle is shown, it is only one example of a possible duty cycle change. The technology is well suited to duty cycles that may be 75% on 25% off, 90% on 10% off, and the like.

In another embodiment, the duty cycle may be dynamically adjusted based on the temperature generation of power amplifier 445 in conjunction with the heat dissipation capabilities associated therewith. For example, during the day, the heat generation versus heat dissipation characteristics may provide a large duty cycle change (such as 50% on/off) to maintain the power amplifier 445 and other components within their heat tolerances. However, in the evening, during rainfall, or the like, a smaller duty cycle change (such as 10% off) may be enough to maintain a heat generation-dissipation balance.

Similarly, if sensor 220 reaches a battery discharge threshold, bit rate transmission adjuster 230 would increase the bit rate to reduce the amount of power utilized by base station 110. Again, since the duty cycle is halved, only half the power is needed to maintain the specified power output. Although 30 Watts is utilized as the specified power output in an example herein, the actual power level of the specified power output may be any number of Watts. The utilization of 30 Watts is provided only for purposes of clarity in the examples associated herewith.

With reference now to FIG. 6, a flowchart 600 of a method for controlling power dissipation in a base station of a NSS is shown according to one embodiment.

With reference now to 605 of FIG. 6 and to FIG. 3, one embodiment utilizes a sensor 220 to monitor one or more components of base station 110. For example, one embodiment may utilize a temperature sensor 320 to monitor one or more components of base station 110. In another example, one embodiment may utilize a battery sensor 310 to monitor battery life of one or more batteries utilized by base station 110. In yet another embodiment, base station 110 may include temperature sensor 320 and battery sensor 310.

With reference now to 610 of FIG. 6, one embodiment increases a transmission bit rate, based on information from sensor 220, from a pre-defined bit rate to an increased transmission bit rate for an NSS message transmitted from the base station without reducing transmission power level of the base station.

In one embodiment, the increase in the transmission bit rate is performed when one or more components of base station 110 reach sensor 220 threshold. For example, one embodiment may utilize temperature sensor 320 to monitor one or more components of base station 110. As such, the sensor threshold may be a predefined temperature based on a temperature limitation of one or more components of base station 110. For example, temperature sensor 320 threshold may be based on a maximum operating temperature for one or more components within base station 110.

In another example, one embodiment may utilize battery sensor 310 to monitor battery life of one or more batteries utilized by base station 110. As such, battery sensor 310 threshold may be based on power output of one or more of the batteries utilized by base station 110. For example, battery sensor 310 threshold may be based on a minimum power level for one or more batteries utilized by base station 110.

In yet another embodiment, the increasing of the transmission bit rate may occur when one or more components of base station 110 approach sensor 220 threshold. In other words, instead of waiting till one or more components reaches sensor 220 threshold, one embodiment may recognize a trend of one or more components of base station 110 that would ultimately result in sensor 220 reaching the threshold. Instead of waiting until sensor 220 reached the threshold, one embodiment may proactively increase the transmission bit rate before one or more of the components reaches sensor 220 threshold.

In one embodiment, prior to increasing the bit rate, rover request 270 may be sent from base station 110. In general, rover request 270 is an attempt by base station 110 to make contact with any rover 120 utilizing base station 110.

One embodiment may await a response from rover 120 before increasing the transmission bit rate. For example, in one embodiment, if base station 110 received no reply from any rover 120, base station 110 may stop broadcasting. In another embodiment, if base station 110 received a reply from one or more rover 120, base station 110 could store the rover information, such as in rover information database 295. That way, if base station 110 were to perform the change in the transmission bit rate, base station 110 would be able to inform any rover 120 whose information is stored in rover information database 295.

However, in another embodiment, base station 110 may not wait for rover 120 response before increasing the transmission bit rate.

One embodiment may utilize a data compression method to reduce a data packet size to fit rover broadcast data 250 into the increased transmission bit rate. Another embodiment may delete portions of data to reduce data packet size to fit rover broadcast data 250 into the increased transmission bit rate. Yet another embodiment may utilize a combination of methods to reduce the data packet size of rover broadcast data 250 such that the information will fit within the package size restriction at the higher bit rate.

With reference now to 615 of FIG. 6 and to FIG. 2, one embodiment periodically provides a bit rate update signal, e.g., bit rate update signal 255 bit rate update signal 255, at the pre-defined bit rate. In one embodiment, bit rate update signal 255 bit rate update signal 255 informs any parties utilizing base station 110 of the increased transmission bit rate at which rover broadcast data 250 is being transmitted.

In one embodiment, additional increases in the transmission bit rate for rover broadcast data 250 transmitted from base station 110 may be performed without reducing the transmission power level at base station 110. For example, if base station 110 had previously increased the transmission bit rate and one or more components of base station 110 was again approaching, or had reached, a sensor threshold; base station 110 may perform an additional increase in the bit rate.

If an additional increase in the transmission bit rate did occur, in one embodiment base station 110 may periodically provide a first bit rate update signal 255 bit rate update signal 255 at the original pre-defined bit rate for the specific base station 110 and may also provide an additional bit rate update signal 255 bit rate update signal 255 at one or more of the previously utilized transmission bit rates.

For example, base station 110 may have provided rover broadcast data 250 at an original (or predefined) transmission bit rate of 4800 bps. At some point the transmission bit rate may have increased to 9600 bps. Moreover, a third transmission bit rate increase may have occurred resulting in base station 110 transmitting at 19200 bps. In the present example, rover 120a utilizing base station 110 heard the first increase to 9600 bps but missed the second increase to 19200 bps. Similarly, a second rover 120n may have missed both increases and may be monitoring for base station 110 at the predefined bit rate of 4800 bps.

Since, in one embodiment base station 110 will provide bit rate update signal 255 bit rate update signal 255 at both the original (4800 bpi) and the middle 9600 bpi transmission rates, both rover 120a and rover 120n will be able to hear the information about the bit rate increase and know how to receive rover broadcast data 250. Thus, a rover 120 that may have been turned off, out of range or otherwise incommunicado with the base station will be able to quickly find the proper transmission rate at which the base station is broadcasting.

In one embodiment, the present technology may also decrease the transmission bit rate based on information from the sensor. For example, base station 110 may decrease the transmission rate for rover broadcast data 250 from the increased transmission bit rate to a lower transmission bit rate without reducing a transmission power level of base station 110. For example, if the sensor 220 recognizes that the temperature for the component had moved to a lower threshold level, sensor 220 may provide the updated information to bit rate transmission adjuster 230 which would lower the bit rate. In so doing, broadcast module 240 would then begin broadcasting rover broadcast data 250 at the new lower bit rate. In addition, in one embodiment, broadcast module 240 would also periodically broadcast bit rate update signal 255 at the previous higher bit rate, to inform any rover 120 listening that the transmission rate had been lowered.

In one embodiment, the bit rate update signal 255 may be broadcast on all transmission rates utilized by base station 110 for a given period of time. For example, base station 110 may always provide bit rate update signal 255 at the pre-defined bit rate for each base station 110 anytime that base station 110 is broadcasting at a different bit rate. However, for any other bit rates that may have been utilized, base station 110 may only broadcast bit rate update signal 255 at the other utilized bit rates for a period of time, such as, for example, 5 minutes.

Thus, any rover 120 that had adjusted its bit rate for a specific base station 110 would receive the new bit rate update signal 255 informing the rover of the new bit rate at which base station 110 is transmitting. Rover 120 would then be able to adjust to the new bit rate. Similarly, any rover 120 that had adjusted its bit rate for a specific base station 110, and had subsequently had a short term loss of contact with base station 110, during the bit rate change, would be able to hear the new bit rate update signal 255 informing the rover of the new bit rate at which base station 110 is transmitting.

In another embodiment, base station 110 may only provide bit rate update signal 255 at the pre-defined bit rate. Thus, any rover 120 that had adjusted its bit rate for a specific base station 110, and had subsequently been out of contact with base station 110 would be able to go straight to the pre-defined bit rate and hear either rover broadcast data 250 or bit rate update signal 255 providing the bit rate at which base station 110 is presently transmitting.

Bit Rate Update Signal

As described herein, the bit rate update signal 255 is utilized to inform the rover 120 of the new bit rate at which base station 110 is transmitting. In one embodiment, the bit rate update signal 255 includes a separate message that is transmitted at a pre-defined bit rate. For example, a base station 110 may have a known default transmit rate of 4800 bps. After increasing the transmit rate to 9600 bps, the bit rate update signal 255 separate message may be transmitted at 4800 bps and a time interval such as, every 5 seconds, 20 seconds, 2 minutes, or the like. In general, the separate message would provide information to any rover listening for the base station 110 broadcasts at 4800 bps that the base station is now transmitting at 9600 bps. Thus, a rover 120 that was off-line, out-of-range or had missed the initial data transmission change to 9600 bps would be able to receive the message providing the transmission rate being utilized. After receiving the message, rover 120 could then automatically adjust to the new data rate. In another embodiment, the message could cause a signal to inform the operator to manually change rover 120 to the new data rate.

As shown in FIG. 4, bit rate update signal 255 may be provided on the same communications path 475 that base station 110 is utilizing for all data transmitted to the rover. In another embodiment bit rate update signal 255 may utilize a secondary communications path 477 from base station 110 to the rovers.

When the bit rate update signal 255 is provided on the same communications path 475, the present technology is well suited to utilize a number of distinct methods. For example, the bit rate update signal 255 may be a standalone message that is transmitted at an interval by base station 110. In another embodiment, the bit rate update signal 255 may be included in the header of the message. For example, bit rate update signal 255 may utilize a single bit in the header that would signal the rover to receive messages at the default bit rate or to receive the messages at a second higher previously designated bit rate. In another configuration, bit rate update signal 255 may include information in the header such as a time frame for the bit rate change, the new transmission bit rate, the present transmission bit rate, and the like.

In another embodiment, bit rate update signal 255 may include error information in the header that would cause the rover to translate the message in a default method. For example, the error information may signal the rover to translate the message as an automatic "update" which would cause the rover to automatically update its receiver message bit rate. In another embodiment, the error information may signal the rover to generate a text message that is provided to the user. The text message may inform the user of the impending or already occurring, bit rate change.

In one embodiment, the secondary communications path 477 can be a low data rate messaging system, as is available via mobile phones, such as short message service (SMS), enhanced messaging service (EMS), multimedia message service (MMS) and the like. In another embodiment, secondary communications path 477 may be a point-to-point walkie-talkie system, citizens' band (CB) radios or other radio communications system. In yet another embodiment, the secondary communications path may utilize a network, such as the Internet, local area network (LAN), wide area network (WAN), or the like.

In one embodiment, the secondary communications path 477 may be built into the current radio as a second channel. For example, if base station 110 is using a 450 MHz Private Radio band, occupying a currently otherwise unused channel, a second unused channel may be utilized to deliver the bit rate update signal 255. In so doing, the transmission rate change message could be created by the base station bit rate update signal 255, tuned to the secondary communications path 477, and transmitted as a separate data message for a very short time. In another embodiment, the transmission rate change message may be periodically injected into the power amplifier for transmission.

Example Computing System

Figure 7:
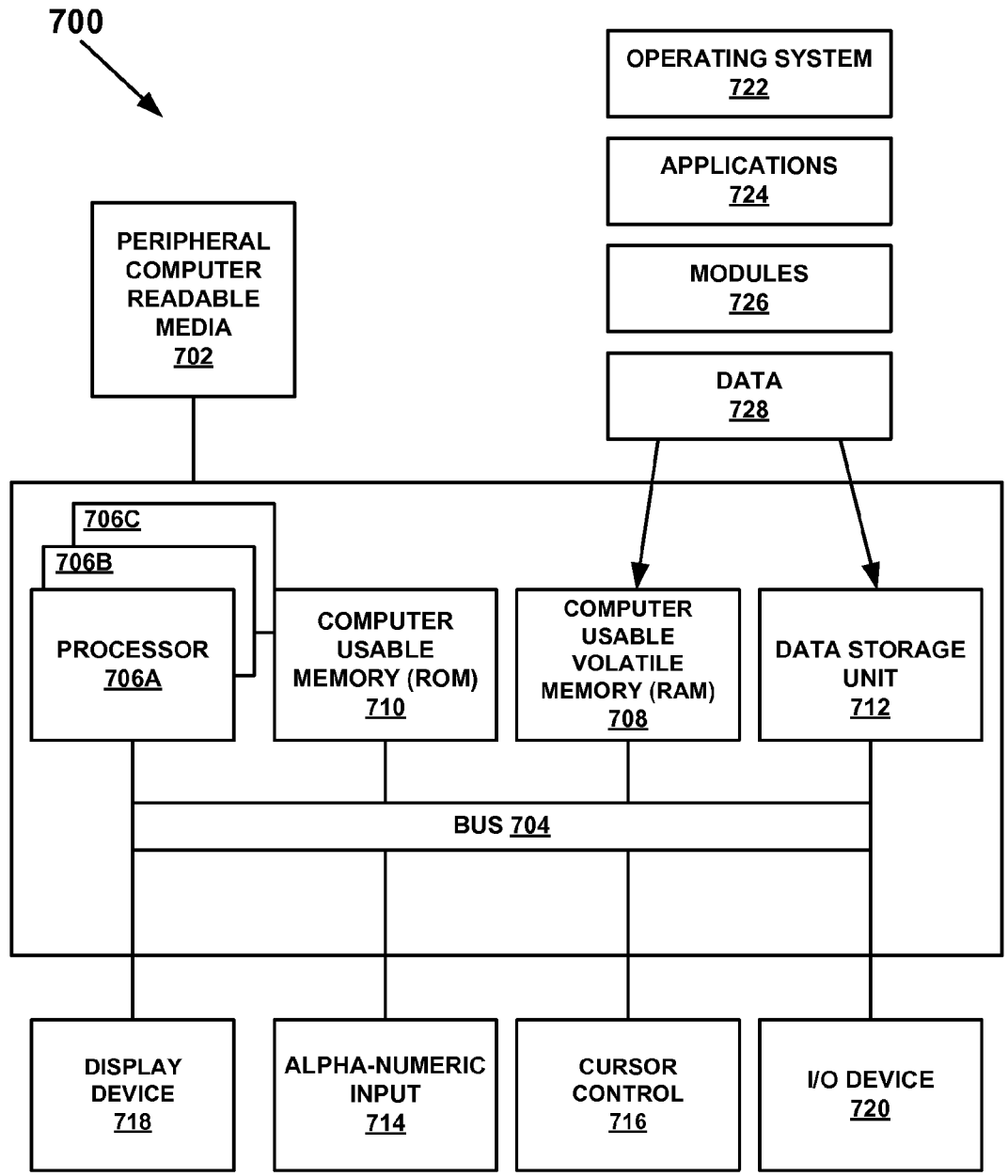
FIG. 7 is a block diagram of a computer system in accordance with one embodiment of the present technology.

With reference now to FIG. 7, portions of the technology may be composed of computer-readable and computer-executable instructions that reside, for example, on computer-usable media of a computer system. FIG. 7 illustrates an example of a computer system 700 that can be used in accordance with embodiments of the present technology. However, it is appreciated that systems and methods described herein can operate on or within a number of different computer systems including general purpose networked computer systems, embedded computer systems, routers, switches, server devices, client devices, various intermediate devices/nodes, standalone computer systems, and the like. For example, as shown in FIG. 7, computer system 700 is well adapted to having peripheral computer readable media 702 such as, for example, a floppy disk, a compact disc, flash drive, back-up drive, tape drive, and the like coupled thereto.

System 700 of FIG. 7 includes an address/data bus 704 for communicating information, and a processor 706A coupled to bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 706B, and 706C may be any of various types of microprocessors. System 700 also includes data storage features such as a computer usable volatile memory 708, e.g. random access memory (RAM) (e.g., static RAM, dynamic, RAM, etc.) coupled to bus 704 for storing information and instructions for processors 706A, 706B, and 706C. System 700 also includes computer usable non-volatile memory 710, e.g. read only memory (ROM) (e.g., read only memory, programmable ROM, flash memory, EPROM, EEPROM, etc.), coupled to bus 704 for storing static information and instructions for processors 706A, 706B, and 706C. Also present in system 700 is a data storage unit 712 (e.g., a magnetic or optical disk and disk drive, solid state drive (SSD), etc.) coupled to bus 704 for storing information and instructions.

System 700 also includes an alphanumeric input device 714 including alphanumeric and function keys coupled to bus 704 for communicating information and command selections to processor 706A or processors 706A, 706B, and 706C. System 700 also includes a cursor control device 716 coupled to bus 704 for communicating user input information and command selections to processor 706A or processors 706B, and 706C. System 700 of the present embodiment also includes a display device 718 coupled to bus 704 for displaying information. In another example, alphanumeric input device 714 and/or cursor control device 716 may be integrated with display device 718, such as for example, in the form of a capacitive screen or touch screen display device 718.

Referring still to FIG. 7, optional display device 718 of FIG. 7 may be a liquid crystal device, cathode ray tube, plasma display device or other display device suitable for creating graphic images and alphanumeric characters recognizable to a user. Cursor control device 716 allows the computer user to dynamically signal the movement of a visible symbol (cursor) on a display screen of display device 718. Many implementations of cursor control device 716 are known in the art including a trackball, mouse, touch pad, joystick, capacitive screen on display device 718, special keys on alpha-numeric input device 714 capable of signaling movement of a given direction or manner of displacement, and the like. Alternatively, it will be appreciated that a cursor can be directed and/or activated via input from alpha-numeric input device 714 using special keys and key sequence commands System 700 is also well suited to having a cursor directed by other means such as, for example, voice commands, touch recognition, visual recognition and the like. System 700 also includes an I/O device 720 for coupling system 700 with external entities. For example, in one embodiment, I/O device 720 enables wired or wireless communications between system 700 and an external network such as, but not limited to, the Internet.

Referring still to FIG. 7, various other components are depicted for system 700. Specifically, when present, an operating system 722, applications 724, modules 726, and data 728 are shown as typically residing in one or some combination of computer usable volatile memory 708, e.g. random access memory (RAM), and data storage unit 712.

Example NSS Receiver

Figure 8:
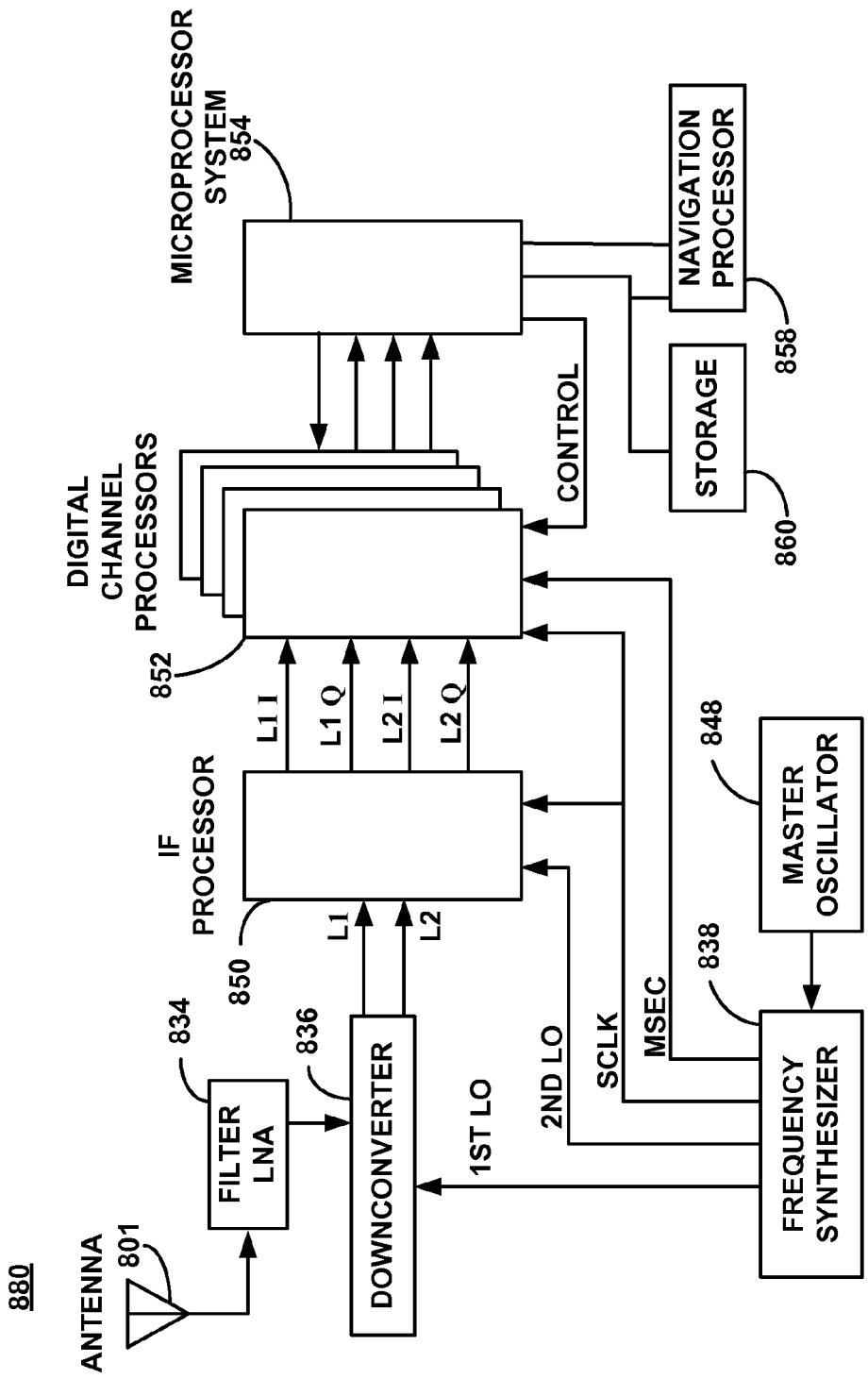
FIG. 8 is a block diagram of an example navigation satellite system (NSS) receiver which may be used in accordance with one embodiment of the present technology.

With reference now to FIG. 8, a block diagram is shown of an embodiment of an example NSS receiver which may be used in accordance with various embodiments described herein. In particular, FIG. 8 illustrates a block diagram of a GNSS receiver in the form of a general purpose GPS receiver 880 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Further, although L1 and L2 signals are described, they should not be construed as a limitation to the signal type; instead, the use of the L1 and L2 signal(s) is provided merely for clarity in the present discussion. Although an embodiment of a global NSS receiver and operation is described herein, the technology is well suited for use with numerous other NSS signals including L5 signal(s), Glonass signal(s), Galileo signal(s), Compass signal(s), various SBAS systems signal(s), and the like.

Embodiments of the present technology may be utilized by GNSS receivers which access the L1 signals alone, or in combination with the L2 signal(s). A more detailed discussion of the function of a receiver such as GPS receiver 880 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 880 of FIG. 8.

In FIG. 8, received L1 and L2 signal is generated by at least one GPS satellite. Each GPS satellite generates different signal L1 and L2 signals and they are processed by different digital channel processors 852 which operate in the same way as one another. FIG. 8 shows GPS signals (L1=1575.42 MHz, L2=1227.60 MHz) entering GPS receiver 880 through a dual frequency antenna 801. Antenna 801 may be a magnetically mountable model commercially available from Trimble® Navigation of Sunnyvale, Calif., 94085. Master oscillator 848 provides the reference oscillator which drives all other clocks in the system. Frequency synthesizer 838 takes the output of master oscillator 848 and generates important clock and local oscillator frequencies used throughout the system. For example, in one embodiment frequency synthesizer 838 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 834 performs filtering and low noise amplification of both L1 and L2 signals. The noise figure of GPS receiver 880 is dictated by the performance of the filter/LNA combination. The downconverter 836 mixes both L1 and L2 signals in frequency down to approximately 175 MHz and outputs the analogue L1 and L2 signals into an IF (intermediate frequency) processor 30. IF processor 850 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 852 inputs the digitally sampled L1 and L2 inphase and quadrature signals. All digital channel processors 852 are typically identical by design and typically operate on identical input samples. Each digital channel processor 852 is designed to digitally track the L1 and L2 signals produced by one satellite by tracking code and carrier signals and to form code and carrier phase measurements in conjunction with the microprocessor system 854. One digital channel processor 852 is capable of tracking one satellite in both L1 and L2 channels.

Microprocessor system 854 is a general purpose computing device which facilitates tracking and measurements processes, providing pseudorange and carrier phase measurements for a navigation processor 858. In one embodiment, microprocessor system 854 provides signals to control the operation of one or more digital channel processors 852. Navigation processor 858 performs the higher level function of combining measurements in such a way as to produce position, velocity and time information for the differential and surveying functions. Storage 860 is coupled with navigation processor 858 and microprocessor system 854. It is appreciated that storage 860 may comprise a volatile or non-volatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

Embodiments of the present invention are thus described. While the present invention has been described in numerous embodiments, the foregoing descriptions of embodiments of the present invention have been presented for purposes of illustration and description. They are not intended to be exhaustive or to limit the invention to the precise forms disclosed, and many modifications and variations are possible in light of the above teaching. The embodiments were chosen and described in order best to explain the principles of the invention and its practical application.

What is claimed is:

1. A method for controlling power dissipation in a base station of a navigation satellite system (NSS), said method comprising:
   utilizing a sensor to monitor one or more components of said base station;
   increasing a transmission bit rate, based on information from said sensor, from a pre-defined bit rate to an increased transmission bit rate for an NSS message transmitted from said base station;
   reducing a duty cycle for one or more transmission components of said base station without reducing a transmission power level of said base station; and
   periodically providing a bit rate update signal at said pre-defined bit rate, said bit rate update signal informing a rover utilizing said base station of said increased transmission bit rate for the NSS message transmitted from said base station.

2. The method of claim 1 further comprising:
performing said increasing of said transmission bit rate and said reducing of said duty cycle when one or more components of said base station reach a sensor threshold.

3. The method of claim 2 further comprising:
utilizing a temperature sensor to provide said sensor threshold for a temperature of one or more components of said base NSS system.

4. The method of claim 2 further comprising:
utilizing a battery sensor to provide said sensor threshold for a battery life of one or more batteries utilized by said base NSS system.

5. The method of claim 1 further comprising:
performing said increasing of said transmission bit rate adjust increment as a discretely variable adjustment.

6. The method of claim 1 further comprising:
performing said increasing of said transmission bit rate adjust increment as a continuously variable adjustment.

7. The method of claim 1 further comprising:
performing said increasing of said transmission bit rate and said reducing of said duty cycle when one or more components of said base station approaches a sensor threshold.

8. The method of claim 1 further comprising:
decreasing said transmission bit rate and increasing said duty cycle, based on information from said sensor, without reducing a transmission power level of said base station.

9. The method of claim 8 further comprising:
decreasing said transmission bit rate from the group consisting of: a discretely variable adjustment and a continuously variable adjustment.

10. The method of claim 1 further comprising:
sending out a rover request; and
awaiting a rover response before increasing said transmission bit rate.

11. The method of claim 1 further comprising:
utilizing a data compression method to reduce a data packet size to fit said NSS message into said increased transmission bit rate.

12. The method of claim 1 further comprising:
deleting portions of data to reduce data packet size to fit said NSS message into said increased transmission bit rate.

13. The method of claim 1 further comprising:
performing additional increases in said transmission bit rate for the NSS message transmitted from said base station without reducing the transmission power level at said base station; and
periodically providing a bit rate update signal to the rover at the pre-defined bit rate and at each increased transmission bit rate.

14. The method of claim 1 further comprising:
providing said bit rate update signal on a same communications path that the base station is utilizing for transmitting data to the rover.

15. The method of claim 14 further comprising:
providing said bit rate update signal in a header of a data transmission.

16. The method of claim 15 further comprising:
including error information in the header causing the rover to translate the message as an automatic "update" thereby automatically update its receiver message bit rate.

17. The method of claim 15 further comprising:
including error information in the header causing the rover to generate a text message informing a user of a bit rate change.

18. The method of claim 1 further comprising:
providing said bit rate update signal on a secondary communications path different from a communications path that the base station is utilizing for transmitting data to the rover.

19. The method of claim 18 wherein said secondary communications path is selected from the group consisting of: a second radio channel, a short message service (SMS), an enhanced messaging service (EMS), a multimedia message service (MMS), Internet, a local area network (LAN), and a wide area network (WAN).

20. A power dissipation controller for a base station of a navigation satellite system (NSS) comprising:
a base station component sensor;
a bit rate transmission adjuster for adjusting a bit rate transmission for an NSS message transmitted from said base station based on an output from said sensor, said bit rate transmission adjusted from an initial bit rate to an increased bit rate;
a duty cycle reducer for reducing a duty cycle of one or more transmission components of said base station without adjustment to a transmission power level of said base station; and
a periodic rover update transmitter for providing a periodic signal at the initial bit rate after the bit rate transmission has been adjusted, said periodic signal providing the increased bit rate at which the NSS message is being transmitted.

21. The power dissipation controller of claim 20 wherein the sensor is a temperature sensor.

22. The power dissipation controller of claim 20 wherein the sensor is a battery strength sensor.

23. The power dissipation controller of claim 20 further comprising:
a receiver for receiving a response from at least one rover prior to adjusting the bit rate transmission for the NSS message transmitted from said base station.

24. The power dissipation controller of claim 20 wherein the bit rate transmission adjustor utilizes a data compression method to reduce data size to fit into higher bit rate for the NSS message transmitted from said base station.

25. The power dissipation controller of claim 20 wherein the bit rate transmission adjustor deletes portions of data to reduce data packet size to fit into higher bit rate for the NSS message transmitted from said base station.

26. A non-transitory computer readable medium having instructions thereon, said instructions causing a processor to perform a method for utilizing a sensor monitoring one or more components of a base station of a navigation satellite system (NSS) to maintain a transmission power level for said base station, said method comprising:
increasing a transmission bit rate from a pre-defined bit rate to an increased transmission bit rate for an NSS message transmitted from said base station;
reducing a duty cycle for one or more transmission components of said base station without reducing a transmission power level of said base station, said increasing of said transmission bit rate and said reducing of said duty cycle performed when one or more of components of said base station reach a sensor threshold; and
periodically providing a bit rate update signal at said pre-defined bit rate, said bit rate update signal informing a rover utilizing said base station of said increased transmission bit rate for the NSS message transmitted from said base station.

27. The non-transitory computer readable medium of claim 26 further comprising:
utilizing a temperature sensor for monitoring a temperature of one or more components of said base NSS system.

28. The non-transitory computer readable medium of claim 26 further comprising:
utilizing a battery sensor for monitoring a battery life of one or more batteries utilized by said base NSS system.

29. The non-transitory computer readable medium of claim 26 further comprising:
increasing said transmission bit rate and reducing said duty cycle when one or more of components of said base station approaches a sensor threshold.

30. The non-transitory computer readable medium of claim 26 further comprising:
performing additional said increasing of said transmission bit rate and said reducing of said duty cycle for the NSS message transmitted from said base station when one or more of said components of said base station reach a sensor threshold, without reducing the transmission power level at said base station; and
periodically providing a bit rate update signal to the rover at the pre-defined bit rate and at each increased transmission bit rate.

31. The non-transitory computer readable medium of claim 26 further comprising:
adding forward error correction to the NSS message.

* * * * *